United States Patent [19]

Weiste

[11] 4,215,824
[45] Aug. 5, 1980

[54] PNEUMATICALLY-OPERATED MACHINE FOR SPREADING GRANULAR MATERIAL

[76] Inventor: Heinrich Weiste, Elfsen No. 6, D-4772 Bad Sassendorf, Fed. Rep. of Germany

[21] Appl. No.: 948,151

[22] Filed: Oct. 3, 1978

[30] Foreign Application Priority Data

Oct. 21, 1977 [AT] Austria ................................. 7553/77

[51] Int. Cl.² ............................................ A01C 15/04
[52] U.S. Cl. .................................. 239/655; 406/123; 406/144
[58] Field of Search ................. 406/144, 123; 222/617; 239/654, 655, 141, 144

[56] References Cited

U.S. PATENT DOCUMENTS

| 3,258,296 | 6/1966 | Von Funk | 406/144 X |
| 3,568,937 | 3/1971 | Grataloup | 239/655 |
| 3,643,872 | 2/1972 | Smith | 239/655 |
| 3,675,856 | 7/1972 | Kverneland | 239/654 |

FOREIGN PATENT DOCUMENTS

| 284449 | 8/1913 | Fed. Rep. of Germany | 239/655 |
| 2025039 | 2/1974 | Fed. Rep. of Germany | |
| 2241534 | 6/1974 | Fed. Rep. of Germany | |
| 250284 | 8/1947 | Switzerland | 239/654 |
| 683531 | 12/1952 | United Kingdom | |
| 873718 | 7/1961 | United Kingdom | |

Primary Examiner—James L. Rowland
Attorney, Agent, or Firm—Merchant, Gould, Smith, Edell, Welter & Schmidt

[57] ABSTRACT

A pneumatically-operated machine for spreading granular material, such as seed, fertilizer or the like. The machine includes a metering mechanism for receiving granular material from a storage receptacle and for metering the received granular material. The metering mechanism has an interior chamber, an inlet through which the granular material passes into the interior chamber and an outlet from which the granular material exits from the interior chamber. A distributor mechanism is provided for distributing the granular material which exits from the metering mechanism. The distributor mechanism includes two main distributor assemblies spaced from one another and a separate means supply conduit connected to each of the main distributor assemblies. An ejector mechanism transfers the granular material from the metering mechanism to the distributor mechanism. The ejector mechanism is disposed below the interior chamber. The ejector mechanism has two substantially horizontal venturi nozzles, a mechanism for supplying air to the venturi nozzles, and a pair of collector nozzles. Each of the collector nozzles has a first end adjacent to one of the venturi nozzles and in communication with the outlet of the metering means. Each of the collector nozzles also has a second end connected to and in communication with one of the main supply conduits whereby air supplied to the venturi nozzles draws the granular material through the outlet of the metering means and passes the granular material through the main supply conduits to the main distributor assemblies.

19 Claims, 6 Drawing Figures

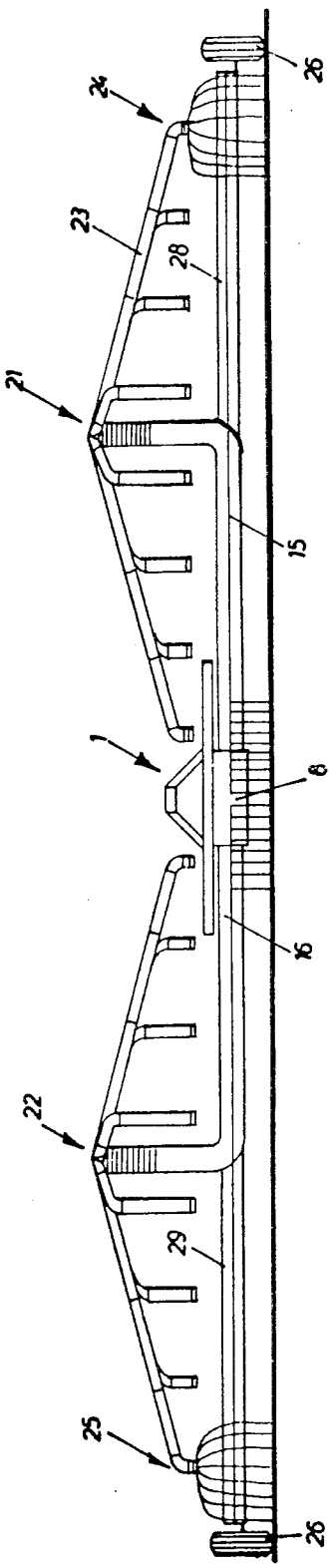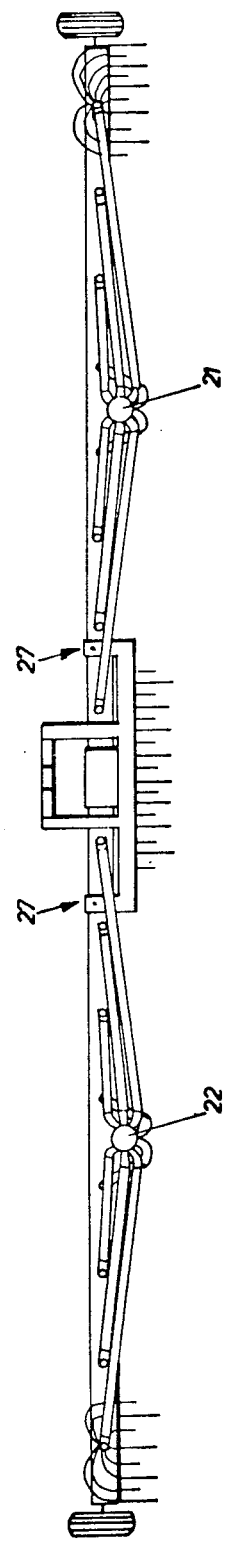

PNEUMATICALLY-OPERATED MACHINE FOR SPREADING GRANULAR MATERIAL

BACKGROUND OF THE INVENTION

The invention relates to a pneumatically-operated machine for spreading granular material, such as seed, fertilizer, or the like, with a metering unit connected to a storage tank and fitted with an inlet hopper, with a rotating annular receptacle for the material to be metered, with stationary deflecting walls leading to discharge apertures and a central opening communicating with an air-line, with an ejector unit connected to the metering unit and opening into the feed for the metered material, through which the said material is passed to the actual spreaders.

Devices of this kind are described, for example, in German Auslegeschrift No. 22 41 534. In this known unit, the ejector unit is arranged in such a manner that it feeds the material released from the metering receptacle upwardly, i.e. a main distributor is arranged above the said ejector unit which passes the material metered by the metering unit to the sub-distributors.

German Auslegeschrift No. 20 25 039 describes and illustrates a general arrangement of this kind, namely a pnuematically-operated machine for distributing granular substances. In this case, frames are located on each side of the central part of the machine. These frames carry not only distributor nozzles, seed shares, seed drills and the like but also sub-distributors distributed uniformly along the length of the said frames.

The purpose of the device according to German Auslegeschrift No. 22 41 534 was to make it possible, on the one hand, to build wide, light-weight machines which could distribute a wide strip of the widest variety of metered substances in a single pass across a field, although the metering had to be carried out with a single mechanism in order to reduce the expense of manufacturing and using such complex and costly metering devices and, on the other hand, to feed this metering unit from a centrally located storage tank divided into different receptacles.

The purpose of the device according to German Auslegeschrift No. 20 25 039 was to provide a machine suitable for spreading wide strips which would overcome the problems associated with the great width of the machine.

In the case of a device according to German Auslegeschrift 20 25 039, the width of the machine is limited in that if only a single, centrally-located metering device, fed from a single storage tank, is to be provided, the efficiency of the pneumatic system and its ability to provide a feed are limited. It must also be taken into account, in this connection that, in the known devices, a rebound plate is arranged in the so-called main distributor above the metering unit, from which hoses run to the various sub-distributors. Now if enough air is used to lift the metered material and provide an adequate feed to the end distributor of a machine 30 meters in width, for example, the speed which the metered material strikes the rebound plate is so high the seed may be destroyed and the mechanical parts of the device damaged. Furthermore, this may also result in the desired amount of seed failing to fill the cross section of the feed line, and in seed accumulating in bend areas, and thus interfering with correct metering to the material.

It is therefore the purpose of the invention to provide a metering arrangement which can be used with wide machines without requiring too much air at too high a speed to deliver the metered material.

SUMMARY OF THE INVENTION

The present invention relates to a pneumatically-operated machine for spreading granular material. The machine is comprised of a metering means, a distributor means, and an ejector means. The metering means receives granular material from a storage receptacle and meters the received granular material. The metering means has an interior chamber, an inlet through which the granular material passes into the interior chamber and an outlet from which the granular material exits the interior chamber. The distributor means distributes the granular material that exits from the metering means. The distributor means includes two main distributor assemblies spaced from one another and a separate main supply conduit connected to each of the main distributor assemblies. The ejector means transfers the granular material from the metering means to the distributor means. The ejector means is disposed below the interior chamber. The ejector means includes two substantially horizontal venturi nozzles, means for supplying air to the venturi nozzles, and a pair of collector nozzles. Each of the collector nozzles has a first end adjacent to one of the venturi nozzles and in fluid communication with the outlet of the metering means. Each of the collector nozzles has a second end connected to and in communication with one of the main supply conduits whereby air supplied to the venturi nozzles draws the granular material through the outlet of the metering means and passes the granular material through the main supply conduits through the main distributor assemblies.

The purpose discussed in the last paragraph of the Background of the Invention is achieved according to the invention, in that the known ejector unit is arranged below the central opening in the metering unit, and consists of a central air supply with two nozzles which are arranged substantially horizontally and to which are connected collector nozzles at the ends of the main delivery lines leading to the main distributors.

According to the invention, therefore, the metering is carried out in known fashion in conjunction with a single feed container, located for example upon an agricultural tractor, and a single metering unit. In contrast to the prior art, however, this metering unit feeds not one but two main distributors which are arranged respectively centrally on the frames adjacent the central part of the machine. Thus, in complete contrast to the known devices, the ejector unit operates not vertically but horizontally and, again in complete contrast to the known devices, it feeds not one main distributor, but two main supply lines adjacent this central part of the device, which lead to the subdistributors. This reduces the volume and the velocity of the air and thus increases the feeding performance and the accuracy of distribution.

It is essential to the arrangement according to the invention that a core component comprising the metering unit be arranged, in the case of wide machines, in the center of the machine, where the metering can be carried out and whence the supply lines can be fed.

An example of embodiment of the invention will be explained hereinafter in conjunction with the drawings attached hereto, although the invention is not restricted to this design.

BRIEF DESCRIPTION OF THE DRAWINGS

FIG. 3 is a view of the metering device according to FIG. 2 along the line 3—3 therein;

FIG. 6 is a plan view of the device according to FIG. 5.

DESCRIPTION OF THE PREFERRED EMBODIMENT

Figure 1:
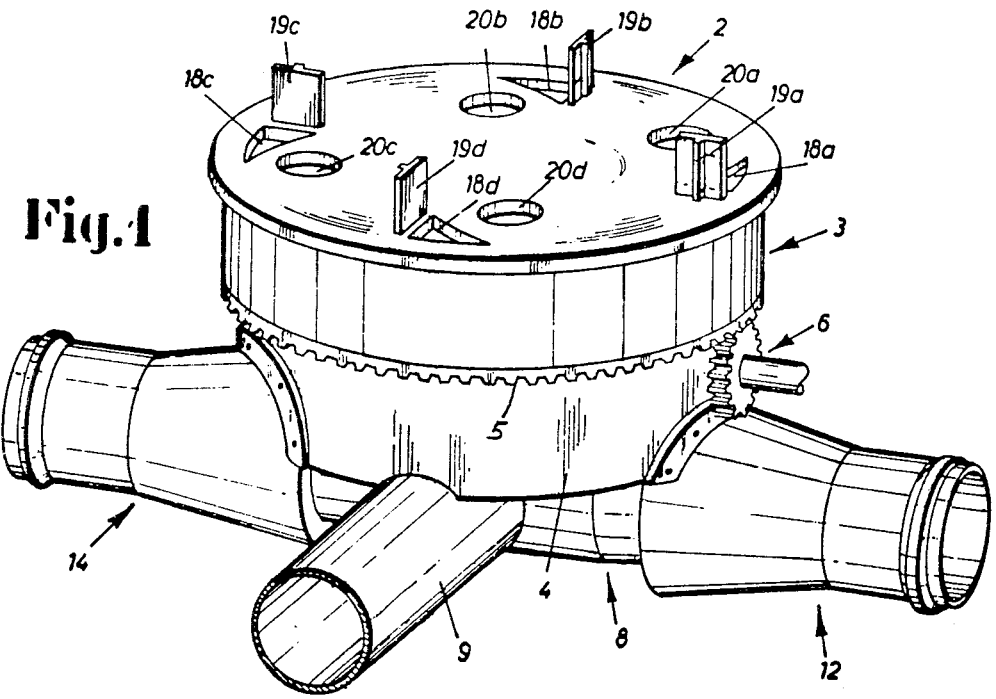
FIG. 1 is a diagrammatic perspective view of a metering device according to the present invention.
Figure 2:
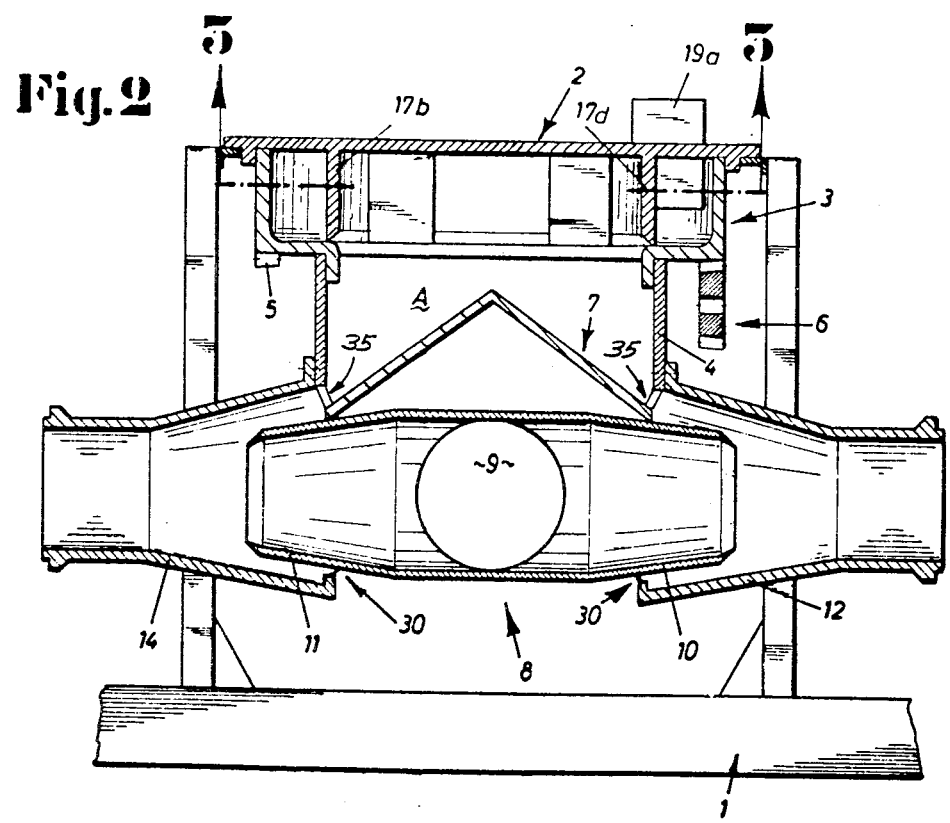
FIG. 2 is a diagrammatic cross section along the line 2—2 in FIG. 3 of a metering device according to the invention.
Figure 5:
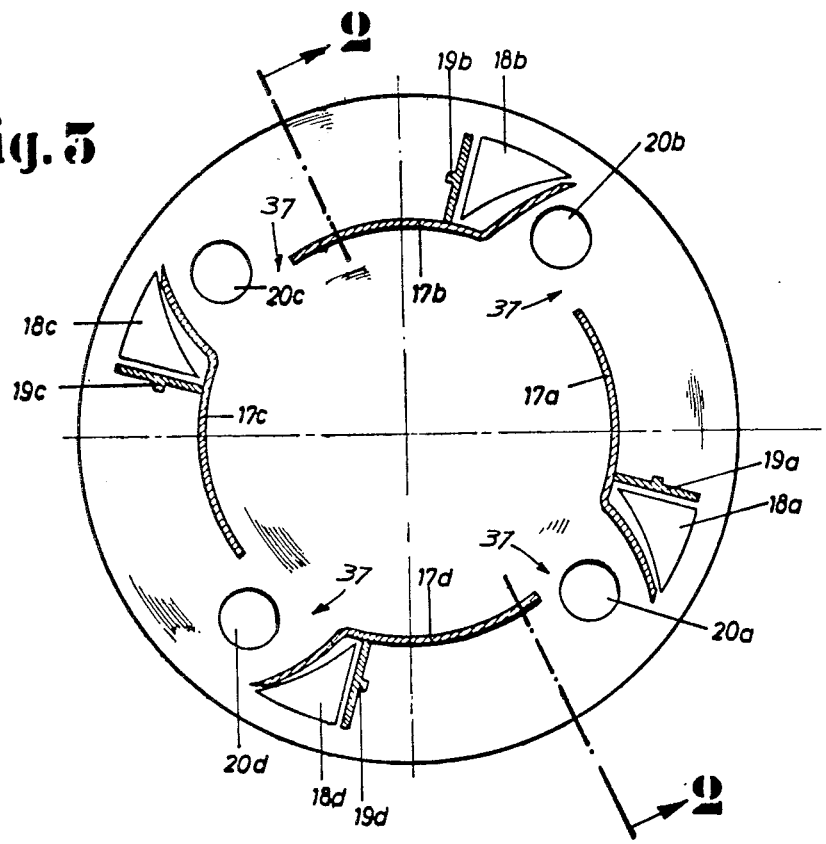
FIG. 5 is a diagrammatic front view of the distributing device for the metered material.

In FIGS. 2 and 5 the reference numeral 1 refers generally to the central portion of the carrier of a pneumatic machine for distributing granular material. Located in the central portion 1 is a metering unit consisting generally of an upper cover 2, a receptacle 3, and a cylindrical wall 4 which supports the receptacle 3. The receptacle 3 is driven in relation to wall 4 and cover 2. For this purpose, the receptacle 3 is fitted with a toothed ring 5 co-operating with a drive pinion 6, the means used to drive the pinion 6 not being shown in the drawing.

Arranged within central opening or interior chamber A formed by cylindrical wall 4 is a generally conically shaped distributor cone 7 located above an ejector unit 8. As is best seen in FIG. 2, the cone 7 has a base which is supported on a top of the ejector unit. The ejector unit 8 is comprised mainly of a central air supply duct 9 and two adjoining venturi nozzles 10, 11 which deflect the central supply of air into two horizontal streams. Adjoining venturi nozzles 10, 11 are collector nozzles 12, 14 communicating with main supply lines 15, 16 shown in FIG. 5.

With reference to FIGS. 2 and 3 it will be seen that the stationary deflecting walls 17a, 17b, 17c, 17d are arranged within rotating receptacle 3, the material accumulating at these walls being guided by them into central chamber A through discharge apertures 37 formed between adjacent deflecting walls 17 and thus to distributor cone 7. The reference numerals 18a, 18b, 18c, 18d identify openings in the inlet hopper which feed the material to be metered from a central bin, not shown in the drawing. Metering slides 19a, 19b, 19c, 19d adjoin openings 18a to 18d, as seen in the direction of rotation, and thus control the volume of material arriving from the inlet hoppers. Located above the deflecting walls, i.e. above the areas where the material accumulates, are air inlet 20a, 20b, 20c, 20d which are adjustable in size and which contribute, by suction, to a uniform flow of material. In this connection it should be noted that the negative pressure produced by air supply 9 above this air supply and above venturi nozzles 10 and 11 is adjustable by air inlets 20a to 20d.

The way in which a metering device of this type operates is known per se from the prior publications mentioned in the Background of the Invention, and therefore needs no further explanation.

The basic construction of the machine according to the invention may be gathered from FIG. 5. Adjoining central portion 1 and ejector unit 8, visible in the drawing, are main supply conduits or lines 15, 16 leading to main distributor assemblies 21, 22, the design of which is known per se. Subdistributor assemblies 24, 25 are connected, by appropriate hoses or pipes, generally marked 23 in the drawing, to the main distributors 21, 22 on each side of the machine. In the drawing, only two of the sub-distributors 24 and 25 bear reference numerals. As seen in the drawings, the sub-distributors 24, 25 are spaced uniformly or at substantially equal intervals.

Main distributors 21, 22 are carried on each side of central part 1 on frame members, the ends of which are equipped with wheels 26 and which, like the prior art, can be folded about hinge points 27 into a so-called transportation position. According to one essential characteristic of the invention, the first part of the length of these frame members is formed by main supply lines 15, 16, i.e. the main supply lines in this example of embodiment are made of strong steel pipes which not only feed the material to be distributed, but also provide the frame with the necessary strength. These pipes are followed by struts 28, 29 which, like main supply lines 15, 16 carry the necessary distributor nozzles, seed shares, track looseners, etc.

The arrangement according to the invention ensures that the air required to feed the metered material is not all fed centrally to one main distributor, but is divided between two main distributors 21, 22 which must be supplied by this amount of air. The main distributors are located half-way along the feed path, where there is no longer any high pressure or strong impact forces.

As may be gathered from FIG. 2 the actual venturi nozzles 10, 11 are sealed off at the bottom 30 from the collector nozzles 12, 14, and all of the suction air produced by the venturi nozzles 10, 11 therefore acts upon the top of distributor cone 7 through release aperture 35. This ensures that the release of material from the metering unit through the release apertures 35 to collector nozzles 12, 14 is as uniform as possible. As may be gathered from FIG. 4 it is quite possible to replace receptacle 3 according to FIG. 2 by receptacle 3a according to FIG. 4 which has a plurality of receiving chambers for the material to be distributed.

Figure 4:
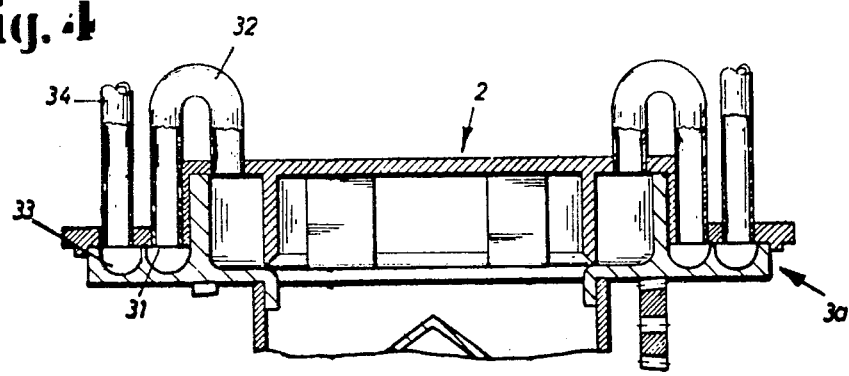
FIG. 4 is a cross section through a modified design.

Whereas in the design according to FIGS. 2 and 3 only fertilizer and seed are supplied to the distributing device, the fertilizer through hopper 18a and the seed through hopper 18b, for example, in the design according to FIG. 4 it is possible to use additional substances, e.g. insecticides or inoculants. In the design according to FIG. 4 the latter are stored in annular feed containers 31 from which they are drawn by the suction produced by apertures 20a to 20d, and are passed through a line 32 into the main receptacle where air blowing on the seed mixes them intimately therewith, thus inoculating the seed. The substantially vertical entry of line 32 into the chamber containing the seed ensures satisfactory distribution of the inoculant in the seed.

Feed container 33 in receptacle 3a is used, for example, to accomodate herbicides which may be fed directly to the location where they are to be used through a separate line 34. The force required to deliver this material may be taken from additional blowers, or may be obtained in some other way.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size and arrangement of parts, within the principle of the invention, to the full extent extended by the broad general meaning of the terms in which the appended claims are expressed.

I claim:

1. A pneumatically-operated machine for spreading granular material comprising:

metering means for receiving granular material from a storage receptacle, and for metering the received granular material, said metering means having an interior chamber, an inlet through which said granular material passes into said interior chamber and an outlet from which said granular material exits said interior chamber;

distributor means for distributing the granular material exiting from said metering means, said distributor means including two main distributor assemblies spaced from one another and a separate main supply conduit connected to each of said main distributor assemblies;

ejector means for transfering the granular material from said metering means to said distributor means, said ejector means being disposed below said interior chamber and including two substantially horizontal venturi nozzles, means for supplying air to said venturi nozzles, and a pair of collector nozzles, each of said collector nozzles having a first end adjacent one of said venturi nozzles and in communication with said outlet of said metering means, each of said collector nozzles having a second end connected to and in communication with one of said main supply conduits whereby air supplied to said venturi nozzles draws the granular material through the outlet of said metering means and passes the granular material through said main supply conduits to said main distributor assemblies; and a distributor member supported in said interior chamber and including inclined surfaces downward and outwardly disposed within said interior chamber toward said venturi nozzles so that said granular material is distributed to each of said main distributor assemblies.

2. A machine according to claim 1 including frame members arranged on either side of a central portion of the machine and a plurality of sub-distributor assemblies, one of said main distributor assemblies being supported on each of said frame members half-way along the length thereof, said sub-distributor assemblies being spaced uniformly over the length of said frame members and being supported thereby, and each of said sub-distributor assemblies being connected to and in communication with one of said main distributor assemblies whereby the granular material is supplied to said sub-distributor assemblies.

3. A machine according to claim 2 wherein said frame members on either side of said central portion of the machine are secured thereto in such a manner as to be able to fold.

4. A machine according to claim 1 wherein each of said main supply conduits are comprised of a rigid pipe, each of said rigid pipes forming a first carrier strut between a central part of the machine and one of said main distributor assemblies, and an additional carrier strut attached to each of said pipes, said first and additional carrier struts supporting said sub-distributor assemblies, and a wheel carried on an end of each of said additional carrier struts.

5. A machine according to claim 1, or 2 or 4 wherein a lower portion of each collector nozzle is sealed in relation to an adjacent venturi nozzle whereby suction caused by air passing through said venturi nozzles acts upon said interior chamber.

6. A machine according to claim 5 wherein said inclined surfaces are formed by a generally conically shaped distributor member supported in said interior chamber, said distributor member having an exterior surface and a base, the base of said distributor member being supported on a top of said ejector means, the base of said distributor member being disposed between the outlet from said metering means and the top of said ejector member.

7. A machine according to claim 5 wherein said metering means has a cover and a plurality of air-supply apertures formed through said cover.

8. A machine according to claim 7 wherein said air-supply apertures, are adjustable in size and a deflecting wall extends downwardly from said cover adjacent each of said air-supply apertures.

9. A machine according to claim 7 including at least one air-supply line connected at one of its ends to one of said air-supply apertures and at its other end to an additional receptacle for holding additional substances to be introduced into said interior chamber.

10. A machine according to claim 9 including a plurality of said air-supply lines, each of said air-supply lines being connected at one of its ends to one of said air supply apertures and at its other end of a discrete additional receptacle.

11. A machine according to claim 5 including a plurality of storage receptacles for containing granular materials to be fed to said metering means.

12. A machine according to claim 5 wherein said metering means includes a stationary cover with a plurality of openings for feeding granular material to said interior chamber, a rotating annular receptacle for receiving the granular material passing through said openings, and a plurality of stationary deflecting walls extending downwardly from said cover for guiding granular material in said rotating annular receptacle to said interior chamber through discharge apertures between said deflecting walls.

13. A machine according to claim 1 wherein said metering means includes a stationary cover with a plurality of openings for feeding granular material to said interior chamber, a rotating annular receptacle for receiving the granular material passing through said openings, and a plurality of stationary deflecting walls extending downwardly from said cover for guiding granular material in said rotating annular receptacle to said interior chamber through discharge apertures between said deflecting walls.

14. A pneumatically-operated machine for spreading granular material comprising:

metering means for receiving granular material from a storage receptacle, and for metering the received granular material, said metering means having an interior chamber, an inlet through which said granular material passes into said interior chamber and an outlet from which said granular material exits said interior chamber;

distributor means for distributing the granular material exiting from said metering means, said distributor means including two main distributor assemblies spaced from one another and a separate main supply conduit connected to each of said main distributor assemblies;

ejector means for transfering the granular material from said metering means to said distributor means, said ejector means being disposed below said interior chamber and including two substantially horizontal venturi nozzles, means for supplying air to said venturi nozzles, and a pair of collector nozzles, each of said collector nozzles having a first end adjacent one of said venturi nozzles and in communication with said outlet of said metering means, each of said collector nozzles having a second end connected to and in communication with one of said main supply conduits whereby air supplied to said venturi nozzles draws the granular material through the outlet of said metering means and passes the granular material through said main supply conduits to said main distributor assemblies; and a generally conically shaped distributor member supported in said interior chamber, said distributor member having an exterior surface and a base, the base of said distributor member being supported on a top of said ejector means, the base of said distributor member being disposed between the outlet from said metering means and the top of said ejector member.

15. A machine according to claim 14 including frame members arranged on either side of a central portion of the machine and a plurality of sub-distributor assemblies, one of said main distributor assemblies being supported on each of said frame members half-way along the length thereof, said sub-distributor assemblies being spaced uniformly over the length of said frame members and being supported thereby, and each of said sub-distributor assemblies being connected to and in communication with one of said main distributor assemblies whereby the granular material is supplied to said sub-distributor assemblies.

16. A machine according to claim 15 wherein said frame members on either side of said central portion of the machine are secured thereto in such a manner as to be able to fold.

17. A machine according to claim 14 wherein each of said main supply conduits are comprised of a rigid pipe, each of said rigid pipes forming a first carrier strut between a central part of the machine and one of said main distributor assemblies, and an additional carrier strut attached to each of said pipes, said first and additional carrier struts supporting said sub-distributor assemblies, and a wheel carried on an end of each of said additional carrier struts.

18. A machine according to claim 14 or 15 or 17 wherein a lower portion of each collector nozzle is sealed in relation to an adjacent venturi nozzle whereby suction caused by air passing through said venturi nozzles acts upon said interior chamber.

19. A pneumatically-operated machine for spreading granular material comprising:

metering means for receiving granular material from a storage receptacle, and for metering the received granular material, said metering means including an interior chamber, an inlet through which said granular material passes into said interior chamber, an outlet from which said granular material exits said interior chamber, a stationary cover with a plurality of openings for feeding granular material to said interior chamber, a rotating annular receptacle for receiving the granular material passing through said openings, and a plurality of stationary deflecting walls extending downwardly from said cover for guiding granular material in said rotating annular receptacle to said interior chamber through discharge apertures between said deflecting walls;

distributor means for distributing the granular material exiting from said metering means, said distributor means including two main distributor assemblies spaced from one another and a separate main supply conduit connected to each of said main distributor assemblies; and ejector means for transfering the granular material from said metering means to said distributor means, said ejector means being disposed below said interior chamber and including two substantially horizontal venturi nozzles, means for supplying air to said venturi nozzles, and a pair of collector nozzles, each of said collector nozzles having a first end adjacent one of said venturi nozzles and in communication with said outlet of said metering means, each of said collector nozzles having a second end connected to and in communication with one of said main supply conduits whereby air supplied to said venturi nozzles draws the granular material through the outlet of said metering means and passes the granular material through said main supply conduits to said main distributor assemblies.

* * * * *

UNITED STATES PATENT AND TRADEMARK OFFICE
CERTIFICATE OF CORRECTION

PATENT NO. : 4,215,824
DATED : August 5, 1980
INVENTOR(S) : Heinrich Weiste

It is certified that error appears in the above–identified patent and that said Letters Patent are hereby corrected as shown below:

In the Abstract, line 2, after "like" should be --is disclosed--

Column 1, line 14, after "feed" should be --line--;

Column 1, line 66, "to" should be --of--.

Signed and Sealed this

Eighteenth Day of November 1980

[SEAL]

Attest:

SIDNEY A. DIAMOND

Attesting Officer

Commissioner of Patents and Trademarks